(12) United States Patent
Shmagranoff et al.

(10) Patent No.: US 10,583,694 B2
(45) Date of Patent: Mar. 10, 2020

(54) RADIAL STONE EJECTORS

(71) Applicant: Bridgestone Americas Tire Operations, LLC, Nashville, TN (US)

(72) Inventors: Aleksandr I. Shmagranoff, Akron, OH (US); Stephen T. Miranda, Copley, OH (US); David M. Severyn, North Canton, OH (US); Todd A. Buxton, Norton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 363 days.

(21) Appl. No.: 15/113,057

(22) PCT Filed: Jan. 27, 2015

(86) PCT No.: PCT/US2015/013037
§ 371 (c)(1),
(2) Date: Jul. 21, 2016

(87) PCT Pub. No.: WO2015/119800
PCT Pub. Date: Aug. 13, 2015

(65) Prior Publication Data
US 2017/0028790 A1     Feb. 2, 2017

Related U.S. Application Data

(60) Provisional application No. 61/935,597, filed on Feb. 4, 2014.

(51) Int. Cl.
*B60C 11/13*     (2006.01)
*B60C 11/04*     (2006.01)
*B60C 11/03*     (2006.01)

(52) U.S. Cl.
CPC ........ *B60C 11/047* (2013.01); *B60C 11/0306* (2013.01); *B60C 11/1369* (2013.01); (Continued)

(58) Field of Classification Search
CPC ............. B60C 11/1353; B60C 11/1369; B60C 2011/1361; B60C 11/047
See application file for complete search history.

(56) References Cited

U.S. PATENT DOCUMENTS 3,706,334 A    12/1972  Hoke
3,727,661 A    4/1973   Hoke
(Continued)

FOREIGN PATENT DOCUMENTS

CN    1712252 A      12/2005
CN    101585298 A    11/2009
(Continued)

OTHER PUBLICATIONS

English Abstract of KR10-2005-0089378, dated on Sep. 8, 2005.
(Continued)

*Primary Examiner* — Robert C Dye

(57) ABSTRACT

A pneumatic tire is disclosed having a tread portion including a tread groove having a groove bottom and groove sidewalls. The tread groove has a groove width defined as a shortest distance between the groove sidewalls. The groove has a groove length extending generally parallel to the groove sidewalls. A sequence of circumferentially spaced stone ejector ribs span between the opposed groove sidewalls.

21 Claims, 4 Drawing Sheets

(52) U.S. Cl.
CPC ............... *B60C 2011/0341* (2013.01); *B60C 2011/0346* (2013.01)

(56) References Cited

U.S. PATENT DOCUMENTS

| | | | |
|---|---|---|---|
| 5,160,385 | A | 11/1992 | Goto et al. |
| 5,373,881 | A | 12/1994 | Enoki |
| 5,549,146 | A | 8/1996 | Trabandt et al. |
| 5,975,172 | A | 11/1999 | Nakatsuji |
| 7,703,491 | B2 | 4/2010 | Oyama |
| 8,408,260 | B2 | 4/2013 | Kawagoe |
| 2006/0254684 | A1* | 11/2006 | Tamura ............... B60C 11/0306 152/209.18 |
| 2008/0078487 | A1 | 4/2008 | Ohara |
| 2009/0301622 | A1 | 12/2009 | Brown |
| 2010/0258228 | A1 | 10/2010 | De Benedittis |
| 2012/0287269 | A1 | 11/2012 | Berger |
| 2013/0153104 | A1 | 6/2013 | Buxton |

FOREIGN PATENT DOCUMENTS

| | | |
|---|---|---|
| CN | 201685661 U | 12/2010 |
| CN | 201970800 U | 9/2011 |
| CN | 202006702 U | 10/2011 |
| CN | 102256810 A | 11/2011 |
| CN | 202703142 U | 1/2013 |
| EP | 1619050 | 1/2006 |
| EP | 2234824 B1 | 5/2015 |
| JP | 2000515081 A | 11/2000 |
| JP | 2001030718 A | 2/2001 |
| JP | 2002103918 A | 4/2002 |
| JP | 2002225510 A | 8/2002 |
| JP | 3822337 B2 | 9/2006 |
| JP | 2008296795 A | 12/2008 |
| JP | 2009190469 A | 8/2009 |
| JP | 2010018049 A | 1/2010 |
| JP | 2010184554 A | 8/2010 |
| JP | 2012020702 A | 2/2012 |
| JP | 2012040976 A | 3/2012 |
| KR | 10-2005-0089378 | 9/2005 |
| WO | 9803357 A1 | 1/1998 |
| WO | WO9803357 | 1/1998 |
| WO | 2013115810 A1 | 8/2013 |

OTHER PUBLICATIONS

International Search Report dated May 15, 2015 in corresponding International Application No. PCT/US2015/013037. (not prior art).
European search report, dated Jul. 21, 2017.
European search opinion, dated Jul. 21, 2017.
English abstract of CN201685661U.
English abstract of CN102256810A.

* cited by examiner

RADIAL STONE EJECTORS

BACKGROUND OF THE INVENTION

1. Field of the Invention

The present invention relates generally to the construction of pneumatic tires, and more particularly, but not by way of limitation, to improved constructions for the stone ejectors located in the tread region of a tire.

2. Description of the Prior Art

One problem encountered in the use of pneumatic tires, and particularly for relatively large tires such as those referred to as truck and bus radial tires which are utilized on eighteen wheeler trucks and on buses, is the entrapment of stones in the relatively large tread grooves of the tires. If a stone is trapped in the tread groove against the bottom of the tread groove, repeated impacting of the stone against the ground surface may cause the stone to cut into or drill into the bottom of the tread groove thus eventually reaching the structural members of the tire and degrading the strength and life of the tire.

Such pneumatic tires often are provided with stone ejectors in the bottom of the tread grooves to aid in preventing such stone entrapment.

There is a continuing need for improvement in the design and construction of such stone ejectors.

SUMMARY OF THE INVENTION

A pneumatic tire is disclosed having a tread portion including a tread groove having a groove bottom and groove sidewalls. The tread groove has a groove width defined as a shortest distance between the groove sidewalls. The groove has a groove length extending generally parallel to the groove sidewalls. A sequence of circumferentially spaced stone ejector ribs span between the opposed groove sidewalls.

In another aspect of the invention a pneumatic tire includes a tread portion having a tread groove having a groove bottom and first and second opposed groove sidewalls. A plurality of stone ejectors are circumferentially spaced apart. Each stone ejector extends upward from the groove bottom and is attached to the first and second groove sidewalls. Each stone ejector extends across the tread groove substantially parallel to at least one adjacent stone ejector.

In another embodiment a pneumatic tire includes a tread portion having a generally circumferentially extending groove defined therein. The groove has a groove cross-section defined by a groove bottom and opposed groove sidewalls. The groove has a groove width between the opposed groove sidewalls. A sequence of circumferentially spaced stone ejector ribs span between the opposed groove sidewalls in a direction substantially parallel to a rotational axis of the tire. Each stone ejector rib includes a forward facing sloped ejector wall and a rearward facing sloped ejector wall. The ejector walls may be sloped at slope angles in a range of from about 10° to about 30° to a radius of the tire, such that each stone ejector rib has a wider rib base and a narrower rib top narrower than the rib base. Adjacent stone ejector ribs may be spaced apart at the rib bases by a base spacing no greater than the groove width.

In any of the above embodiments each stone ejector rib may include at least one circumferentially facing sloped ejector wall sloped at a slope angle in a range of from about 10° to about 30° to a radius of the tire, such that each stone ejector rib has a wider rib base and a narrower rib top narrower than the rib base. The slope angle may further be defined in the range of from about 15° to about 25° to the radius of the tire.

In any of the above embodiments adjacent stone ejector ribs may be spaced apart at the rib bases by a base spacing no greater than the groove width, and at the rib tops by a top spacing equal to or greater than the groove width, so that opposed ejector walls of adjacent stone ejector ribs resist retention between the adjacent stone ejector ribs of stones having dimensions equal to or greater than the groove width.

In any of the above embodiments the at least one circumferentially facing sloped ejector wall may include a forward facing sloped ejector wall and a rearward facing sloped ejector wall.

In any of the above embodiments the stone ejector ribs may be equally circumferentially spaced around a majority of the circumference of the tire.

In any of the above embodiments the stone ejector ribs may extend across the tread groove in a direction substantially parallel to a rotational axis of the tire.

In any of the above embodiments the stone ejector ribs may extend across the tread groove parallel to each other.

In any of the above embodiments the stone ejector ribs may have a rib height in a range of from about 4 mm to about 8 mm.

In any of the above embodiments adjacent stone ejector ribs may be spaced apart at a pitched spacing in a range of between 100% and 200% of the groove width.

In any of the above embodiments the tread groove may extend circumferentially around the tire in a zig-zag pattern including alternating straight portions joined at obtuse corners. Each straight portion of the groove may include a plurality of stone ejector ribs.

In any of the above embodiments each stone ejector may comprise a rib extending substantially straight across the tread groove.

In any of the above embodiments each stone ejector may be vertically tapered from a rib base to a rib top.

In any of the above embodiments the tread groove may have a groove width between opposed groove sidewalls, and the rib bases of adjacent parallel stone ejectors may be spaced apart by a spacing less than the groove width.

In any of the above embodiments each rib may have a trapezoidal shape cross-section including a wider rib base and a narrower rib top.

In any of the above embodiments each stone ejector may have a sloped forward facing ejector wall and a sloped rearward facing ejector wall, with the forward and rearward ejector walls being sloped toward each other and defining an included angle therebetween in a range of from about 20° to about 60°.

Numerous objects, features and advantages of the present invention will be readily apparent to those skilled in the art upon a reading of the following disclosure when taken in conjunction with the accompanying drawings.

DETAILED DESCRIPTION

Figure 1:
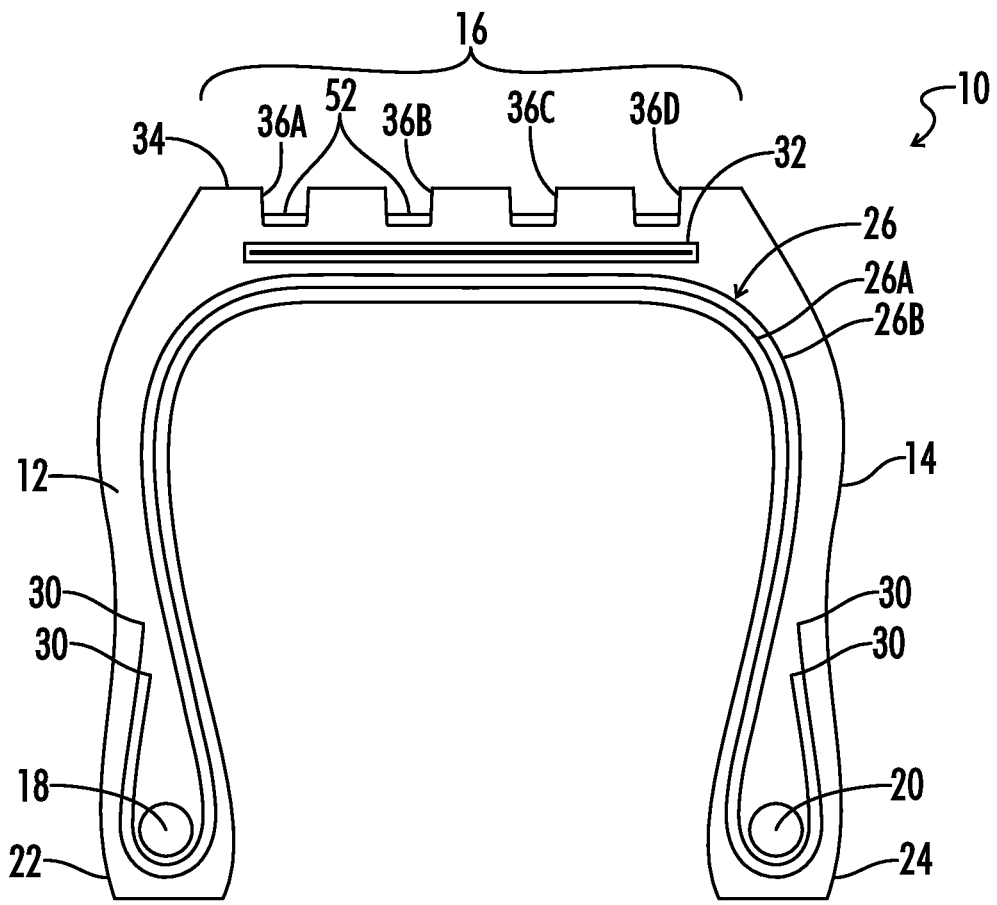
FIG. 1 is a schematic cross-section view of a pneumatic tire incorporating stone ejector ribs.

Following are definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to directions which are parallel to the axis of rotation of a tire.

"Bead" or "bead core" refers to that part of a tire comprising an annular tensile member, the bead core, wrapped by ply cords and shaped, with or without other reinforcement elements to fit a designed tire rim.

"Belt" or "belt ply" refers to an annular layer or ply of parallel cords, woven or unwoven, underlying the tread, not anchored to the bead.

"Carcass" refers to the tire structure apart from the belt structure, tread, undertread, and sidewall rubber but including the beads, (carcass plies are wrapped around the beads).

"Circumferential" refers to lines or directions extending along the perimeter of the surface of the annular tread perpendicular to the axial direction.

"Cord" means one of the reinforcement strands of which the plies in the tire are comprised.

"Equatorial plane (EP)" refers to a plane that is perpendicular to the axis of rotation of a tire and passes through the center of the tire's tread.

"Ply" means a continuous layer of rubber coated parallel cords.

"Radial" and "radially" refer to directions that are perpendicular to the axis of rotation of a tire.

"Radial-ply" or "radial-ply tire" refers to a belted or circumferentially-restricted pneumatic tire in which the ply cords which extend from bead to bead are laid at cord angles between 65 degree and 90 degree with respect to the equatorial plane of the tire.

"Turn-up height" (TH) means the radial distance from the base of the bead core to the upper end of the turn-up.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. Additionally, the term "radially inner" refers to an element that is closer to the axis of rotation than is a "radially outer" element. The terms "axially inward" and "axially inwardly" refer to a general direction towards the equatorial plane of the tire, whereas "axially outward" and "axially outwardly" refer to a general direction away from the equatorial plane of the tire and towards the sidewall of the tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Referring now to FIG. 1, a schematic cross-section view is there shown of a pneumatic tire 10. The tire 10 has first and second sidewalls 12 and 14. A circumferential tread area or tread portion 16 extends between the sidewalls. First and second beads 18 and 20 are located in bead portions 22 and 24 of the first and second sidewalls 12 and 14, respectively. A carcass 26 including one or more body plies 26A and 26B extends through the tread area 16, down through the sidewalls 12 and 14, and wraps around the beads 18 and 20 terminating in turn-up ends 30.

One or more circumferentially extending reinforcing belts, which may be generally referred to as a belt package 32, are placed in the tread portion 16 radially outside of the carcass 26.

The tread portion 16 includes a radially outer ground contacting surface 34 having a plurality of tread grooves 36A, 36B, 36C and 36D therein as seen in FIG. 1. The grooves 36 may have a groove depth 37 in unworn condition.

Figure 3:
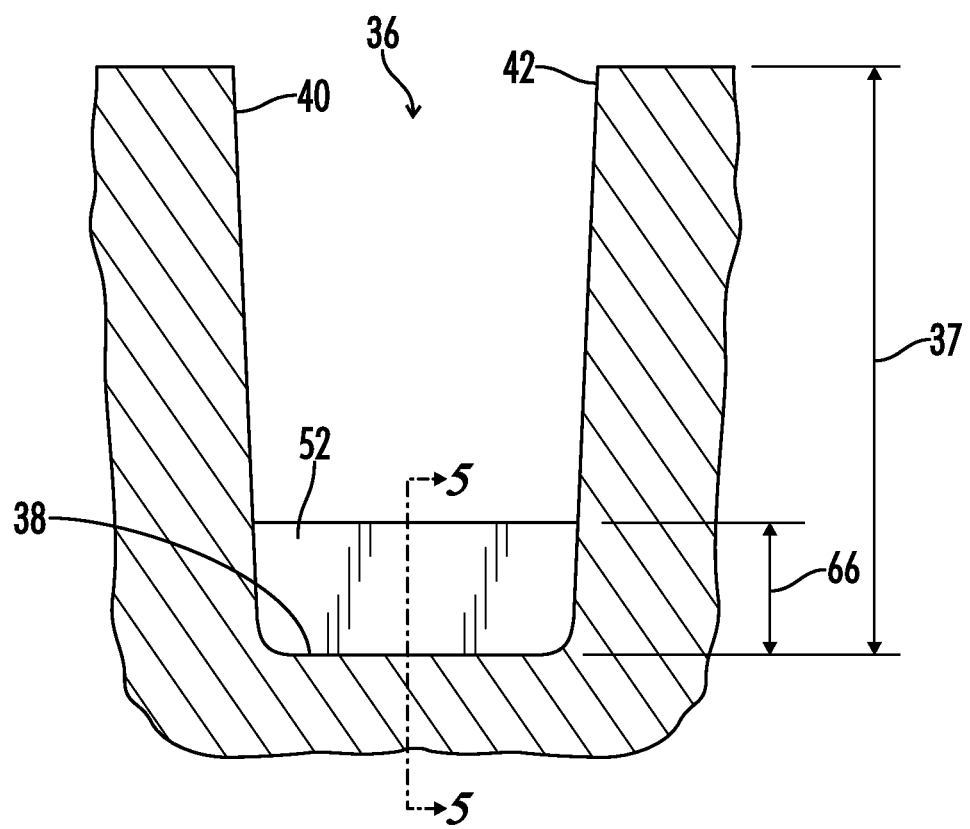
FIG. 3 is a schematic cross-section view along line 3-3 of FIG. 1, showing in elevation view one of the stone ejector ribs.
Figure 4:
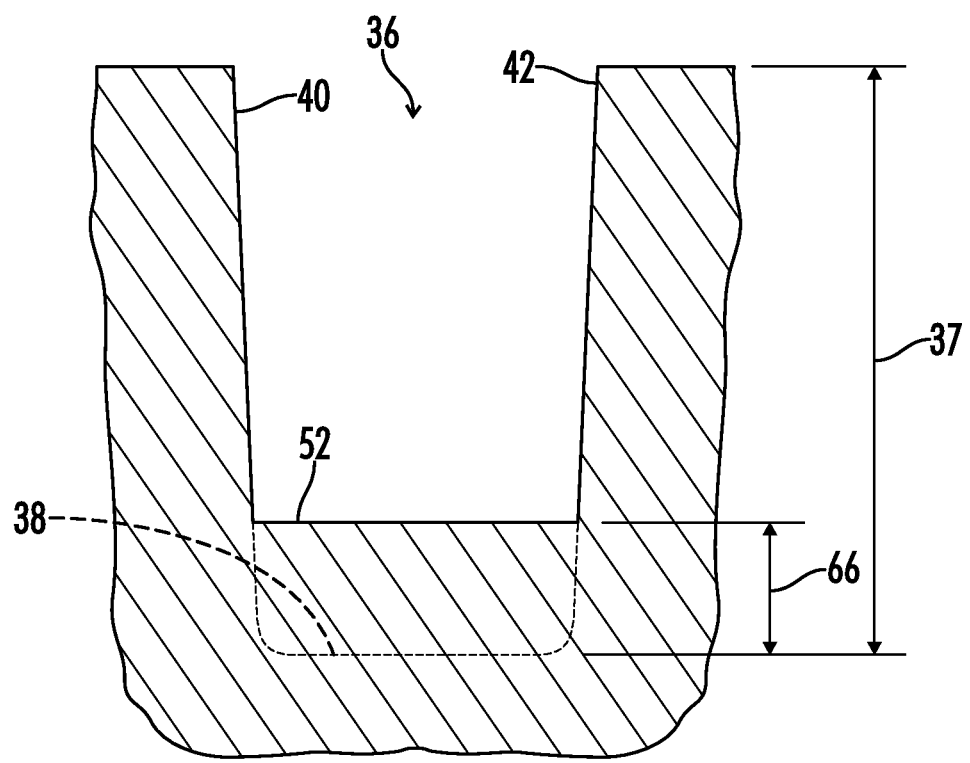
FIG. 4 is a schematic cross-section along line 4-4 of FIG. 1, showing a radial cross-section through one of the stone ejector ribs.

As best seen in the enlarged cross-section view of FIG. 3, each tread groove such as 36A has a groove bottom 38 and groove sidewalls 40 and 42.

Figure 2:
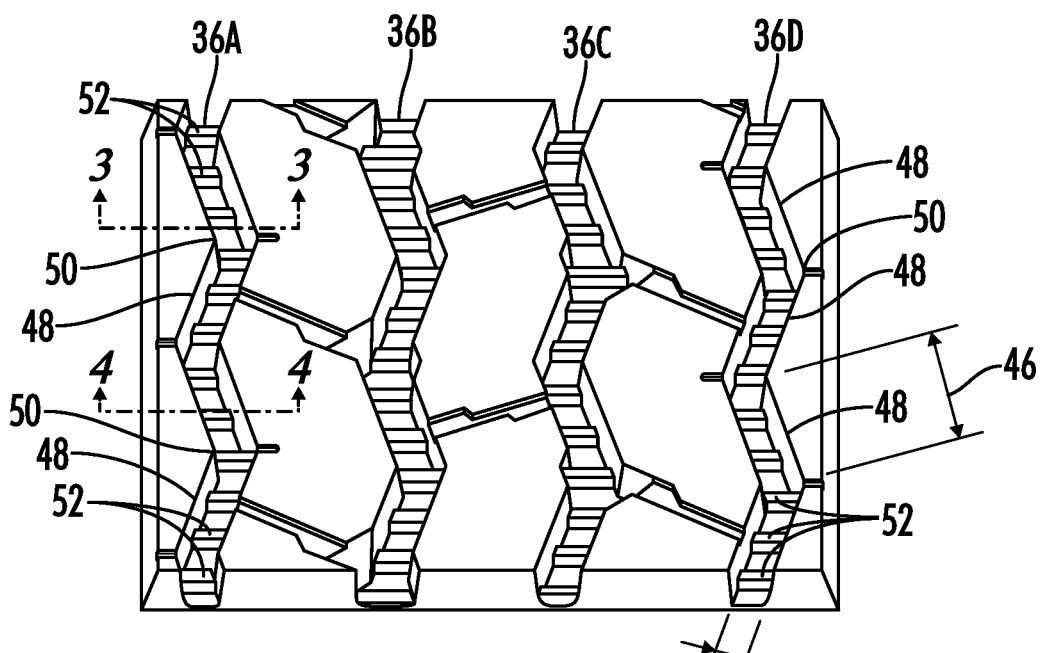
FIG. 2 is a perspective view of the tread region of the tire of FIG. 1.

As best seen in FIG. 2, the grooves 36 have a groove width 44 defined as a shortest width between the groove sidewalls 40 and 42. Each groove 36 has a groove length 46 extending generally parallel to the groove sidewalls 40 and 42.

It will be understood that each of the grooves such as 36A extends generally circumferentially around the circumference of the tire 10. The groove 36A may, as shown for example in FIG. 2, extend circumferentially around the tire 10 in a zig-zag pattern including alternating straight portions 48 joined at obtuse corners 50. As indicated in FIG. 2, the groove length 46 may be defined along each of the straight portions 48.

The shape of the grooves 36A, such as the zig-zag shape shown in FIG. 2, are not critical to the concept of the invention. The grooves may for example be completely straight grooves running in a straight fashion circumferentially around the entire circumference of the tire. The grooves may be zig-zag as shown in FIG. 2. The grooves may have other patterns such as various other wavy or zig-zag shapes. In general, the length of the groove refers to a line generally paralleling the sidewalls of the groove and extending generally around the circumference of the tire.

When a zig-zag shaped groove is used the sequence of stone ejector ribs 52 may include a plurality of stone ejector ribs 52 in each straight portion 48 of the groove 36.

As best seen in FIG. 2, each groove such as 36A may have a row or sequence of stone ejectors or stone ejector ribs 52 circumferentially spaced apart along the groove length 46. Each of the stone ejector ribs 52 spans between the opposed sidewalls 40 and 42.

The sequence of stone ejector ribs 52 may also be described as a plurality of stone ejectors 52 circumferentially spaced apart, with each stone ejector 52 extending upward from the groove bottom 38 and being attached to the first and second groove sidewalls 40 and 42, with each stone ejector 52 extending across the tread groove 36 substantially parallel to at least one adjacent stone ejector.

Figure 5:
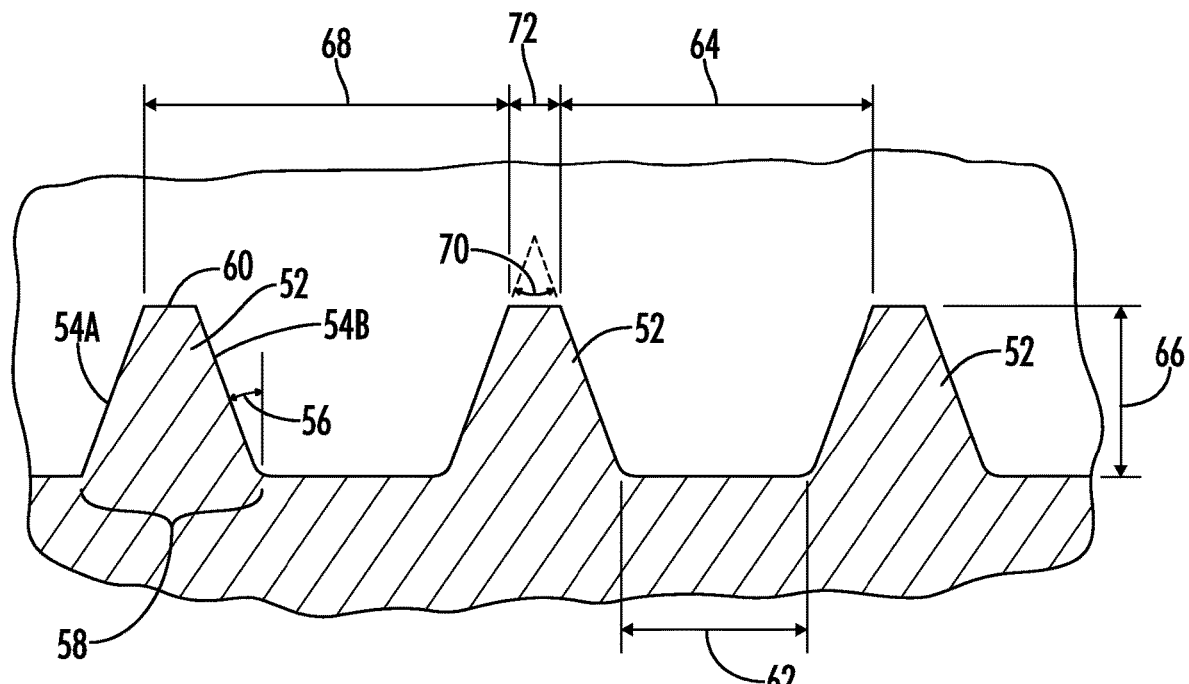
FIG. 5 is a schematic elevation cross-section view taken along line 5-5 of FIG. 4.

As best seen in FIG. 5, each stone ejector rib 52 includes at least one circumferentially facing sloped ejector wall, and preferably two such walls 54A and 54B sloped at an angle 56 to a radius of the tire 10. The two stone ejector walls 54A and 54B may be referred to as a forward facing sloped ejector wall 54A and a rearward facing sloped ejector wall 54B. Thus, each stone ejector rib 52 has a wider rib base 58 and a narrower rib top 60 narrower than the rib base 58. The groove tops 60 may have a top width 72. The top width 72 may be in a range of from 1 mm to 5 mm, and more preferably in a range of from 2 mm to 3 mm. The angle 56 may be in a range of from about 10° to about 30° to a radius of the tire, and more preferably in a range of from about 15° to about 25°, and most preferably approximately 20°.

This selection of the angle 56 results in the sloped walls 54A and 54B of each rib 52 defining an included angle 70 therebetween. The included angle 70 may be in a range of from about 20° to about 60°. More preferably the included angle may be in a range of from about 30° to about 50°. Most preferably the included angle 70 may be approximately 40°.

Adjacent stone ejector ribs 52 are spaced apart at their rib bases 58 by a base spacing 62, preferably no greater than the groove width 44. At their rib tops 60, the adjacent stone ejector ribs 52 are spaced apart by a top spacing 64 equal to or greater than the groove width 44. Such dimensioning of the stone ejector ribs 52 relative to the groove width 44 provides that opposed stone ejector walls 54A and 54B of adjacent stone ejector ribs 52 will resist retention between the adjacent stone ejector ribs 52 of stone having dimensions equal to or greater than the groove width 44.

The stone ejector ribs 52 as shown in FIG. 5 may be described as pyramidal in cross-section or as vertically tapered from the rib base 58 to the rib top 60. Each rib 52 has a trapezoidal shaped cross-section as seen in FIG. 5 including a wider rib base 58 and a narrower rib top 60.

The stone ejector ribs 52 may be equally circumferentially spaced around the circumference of the tire, and more generally, the stone ejector ribs 52 may be equally circumferentially spaced around a majority of the circumference of the tire. Adjacent stone ejector ribs 52 may be spaced apart at a pitch spacing 68 in a range of between 100% and 200% of the groove width 44.

As best seen in FIG. 2, the stone ejector ribs 52 may extend across the tread groove 36 in a direction substantially parallel to a rotational axis of the tire 10. The stone ejector ribs 52 may also extend across the tread groove parallel to each other. While it is preferred that the stone ejector ribs 52 extend parallel to the rotational axis of the tire, it will be appreciated that the stone ejector ribs could be placed at a small angle to the rotational axis of the tire and still provide substantially the same function as described herein. For example, ribs slanted at an angle of plus or minus 20° to the rotational axis of the tire would still result in a functional stone ejector rib.

Each of the stone ejector ribs has a rib height 66. The rib height 66 may be in a range of from about 4 mm to about 8 mm, and more preferably may be in a range of from about 5 mm to about 7 mm, and most preferably may be about 6 mm.

In one example of the embodiment shown in FIG. 5, the rib height 66 is approximately 6 mm, the angle 56 is approximately 20°, the unworn groove depth 37 is approximately 19 mm, the groove width 44 is approximately 10 mm, the top spacing 64 is approximately 10.2 mm, the pitch spacing 68 is approximately 11.6 mm, and the top width 70 is approximately 2.3 mm.

Figure 6:
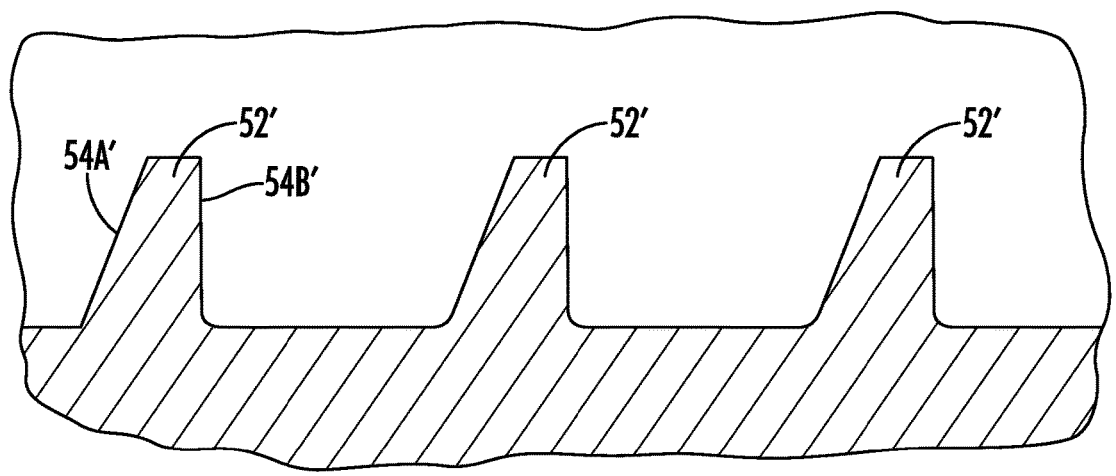
FIG. 6 is a view similar to FIG. 5 showing an alternative embodiment of the stone ejector ribs having only one sloped wall.

Referring now to FIG. 6, an alternative embodiment is shown having modified ribs 52' having one sloped wall 54A' and one straight wall 54B'. The embodiment of FIG. 6 may otherwise be constructed as described above with regard to the embodiment of FIG. 5.

The stone ejector ribs 52, which may also be referred to as radially oriented stone ejectors, are applied to the bottom 38 of the grooves 36 in order to prevent stones from being held and potentially begin to drill into the belts of the tire 10. The stone ejector ribs 52 are fully attached to the adjacent groove walls 40 and 42 to provide extra stiffness, which will help keep the stone ejector ribs 52 from being displaced by the larger stones that have a higher potential to drill into the bottom 38 of the grooves 36. Placing the stone ejectors in a radial pattern, that is as ribs substantially parallel to the rotational axis of the tire 10, as opposed to the typical circumferential patterns used in the prior art, allows the circumferential spaces between the stone ejector ribs 52 to open and close as the tire rolls through its footprint on the ground surface, making it harder for a larger stone to get held in the area between the stone ejector ribs. As the tire rolls out of its footprint on the ground surface, and the space between the ejector ribs 52 opens up again, any smaller stone that may have been able to fit in while the space was closed up will be able to fall out. As the tire rolls through its footprint, the rib tops 60 are compressed toward each other slightly, and as the tire rolls out of its footprint the tops 60 spring back away from each other to their original shape. The angle 56 of the sidewalls 54 and the spacing between adjacent stone ejector ribs causes the circumferential gap between stone ejector ribs to act like a mini-groove to provide an area that is less likely to hold stones than a typical grooved bottom.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A pneumatic tire comprising:
   a tread portion having a generally circumferentially extending groove defined therein, the groove having a groove cross-section defined by a groove bottom and opposed groove sidewalls, the groove having a groove width between the opposed groove sidewalls; and
   a sequence of circumferentially spaced stone ejector ribs spanning between the opposed groove sidewalls;
   wherein each stone ejector rib includes at least one circumferentially facing sloped ejector wall sloped at a slope angle in a range of from about 10° to about 30° to a radius of the tire, such that each stone ejector rib has a wider rib base and a narrower rib top narrower than the rib base, the narrower rib top having a top width, each rib having a rib height greater than the top width; and wherein adjacent stone ejector ribs are spaced apart at the rib bases by a base spacing no greater than the groove width, and at their rib tops by a top spacing greater than the groove width, so that opposed ejector walls of adjacent stone ejector ribs resist retention between the adjacent stone ejector ribs of stones having dimensions greater than the groove width.

2. The tire of claim 1, wherein the slope angle is in a range of from about 15° to about 25° to a radius of the tire.

3. The tire of claim 1, wherein:
the at least one circumferentially facing sloped ejector wall includes a forward facing sloped ejector wall and a rearward facing sloped ejector wall.

4. The tire of claim 1, wherein:
the stone ejector ribs are equally circumferentially spaced around a majority of a circumference of the tire.

5. The tire of claim 1, wherein:
the stone ejector ribs extend across the tread groove in a direction substantially parallel to a rotational axis of the tire.

6. The tire of claim 1, wherein:
the stone ejector ribs extend across the tread groove parallel to each other.

7. The tire of claim 1, wherein:
the rib height is in a range of from about 4 mm to about 8 mm.

8. The tire of claim 1, wherein:
adjacent stone ejector ribs are spaced apart at a pitch spacing in a range of between 100% and 200% of the groove width.

9. The tire of claim 1, wherein:
the tread groove extends circumferentially around the tire in a zig-zag pattern including alternating straight portions joined at obtuse corners.

10. The tire of claim 9, wherein:
the sequence of stone ejector ribs includes a plurality of stone ejector ribs in each straight portion of the groove.

11. A pneumatic tire, comprising:
a tread portion including a tread groove having a groove bottom and first and second opposed groove sidewalls; and a plurality of stone ejectors circumferentially spaced apart, each stone ejector extending upward from the groove bottom and being attached to the first and second groove sidewalls, each stone ejector extending across the tread groove substantially parallel to at least one adjacent stone ejector;

wherein each stone ejector comprises a rib extending substantially straight across the tread groove;

wherein each rib is vertically tapered and each rib has a trapezoidal shaped cross-section including a wider rib base and a narrower rib top having a top width, and each rib has a rib height greater than the top width;

wherein the tread groove has a groove width between the opposed groove sidewalls;

wherein the rib bases of adjacent parallel stone ejectors are spaced apart by a base spacing less than the groove width, and the rib tops of adjacent parallel stone ejectors are spaced apart by a top spacing greater than the groove width.

12. The tire of claim 11, wherein:
each of the stone ejectors extends across the tread groove substantially parallel to a rotational axis of the tire.

13. The tire of claim 11, wherein:
the rib height is in a range of from about 4 mm to about 6 mm.

14. The tire of claim 11, wherein:
each stone ejector has a sloped forward facing ejector wall and a sloped rearward facing ejector wall, the forward and rearward ejector walls being sloped toward each other and defining an included angle therebetween in a range of from about 20° to about 60°.

15. A pneumatic tire comprising:
a tread portion having a generally circumferentially extending groove defined therein, the groove having a groove cross-section defined by a groove bottom and opposed groove sidewalls, the groove having a groove width between the opposed groove sidewalls; and a sequence of circumferentially spaced stone ejector ribs spanning between the opposed groove sidewalls in a direction substantially parallel to a rotational axis of the tire, each stone ejector rib including a forward facing sloped ejector wall and a rearward facing sloped ejector wall, the ejector walls being sloped at slope angles in a range of from about 10° to about 30° to a radius of the tire, such that each stone ejector rib has a wider rib base and a narrower rib top narrower than the rib base, adjacent stone ejector ribs being spaced apart at the rib bases by a base spacing no greater than the groove width and at the rib tops by a top spacing greater than the groove width, wherein each rib top has a top width and each rib has a rib height greater than the top width.

16. The tire of claim 15, wherein the slope angles are in a range of from about 15° to about 25° to a radius of the tire.

17. The tire of claim 15, wherein:
the stone ejector ribs are equally circumferentially spaced around a majority of a circumference of the tire.

18. The tire of claim 15, wherein:
the rib height is in a range of from about 4 mm to about 8 mm.

19. The tire of claim 15, wherein:
adjacent stone ejector ribs are spaced apart at a pitch spacing in a range of between 100% and 200% of the groove width.

20. The tire of claim 15, wherein:
the tread groove extends circumferentially around the tire in a zig-zag pattern including alternating straight portions joined at obtuse corners.

21. The tire of claim 20, wherein:
the sequence of stone ejector ribs includes a plurality of stone ejector ribs in each straight portion of the groove.

* * * * *